April 4, 1967          A. GOEKE          3,312,103
HYDRAULIC PRESSURE CONTROL APPARATUS
Filed March 23, 1965          2 Sheets-Sheet 1
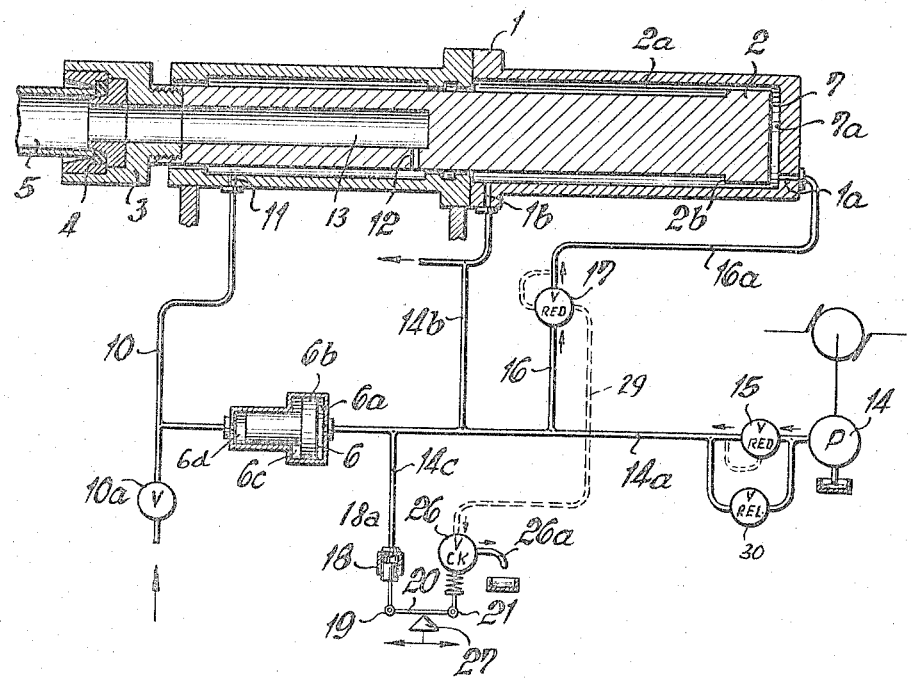

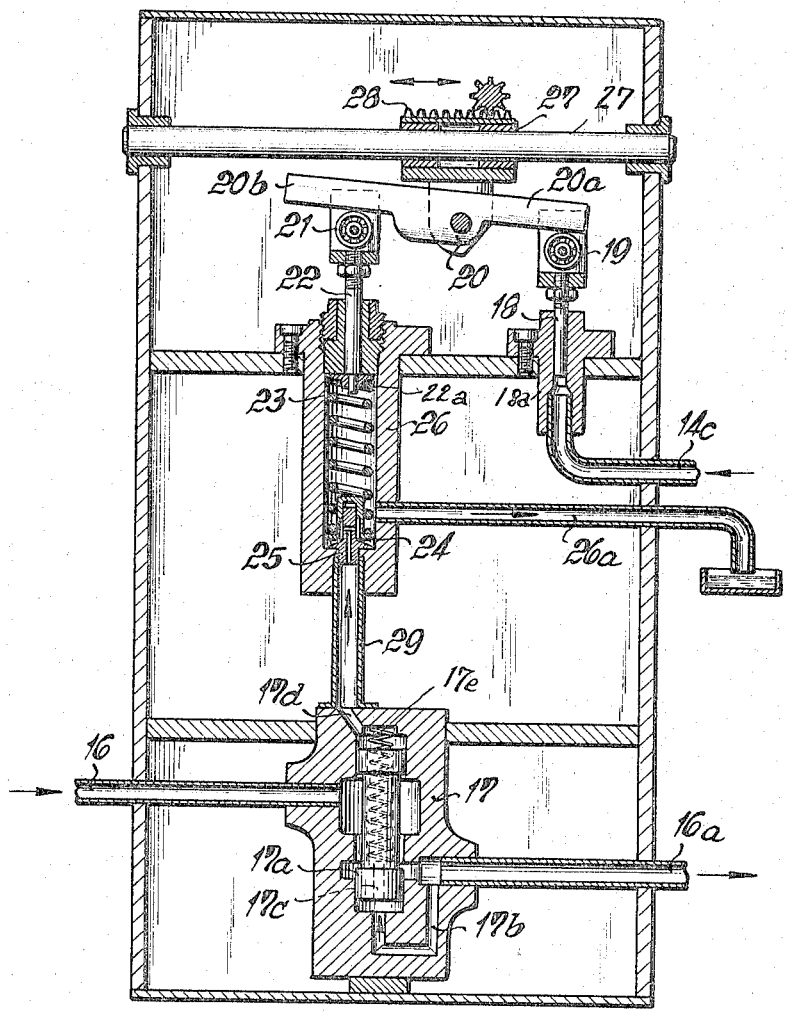

United States Patent Office 3,312,103
Patented Apr. 4, 1967

3,312,103
HYDRAULIC PRESSURE CONTROL APPARATUS
Alfons Goeke, Solingen, Germany, assignor to Th. Kieserling and Albrecht, Solingen, Germany
Filed Mar. 23, 1965, Ser. No. 442,010
Claims priority, application Germany, Mar. 26, 1964, K 52,508
20 Claims. (Cl. 73—49.1)

The present invention relates to a hydraulic pressure control apparatus for holding the pressures acting on two or more hydraulic pressure responsive devices at a predetermined desired ratio, and more particularly to a testing apparatus for testing pipes in which the sealing pressure must correspond to the testing pressure in order to prevent leakage of pressure fluid, or buckling of the tested pipe.

Testing devices for pipes are known in which the testing pressure acting within a tested pipe and the sealing pressure exerted on the end of the pipe by a piston are adjustable. However, the apparatus according to the prior art does not permit a fine adjustment of the testing and sealing pressures, and achieves a balancing of these pressures only at full testing pressure, whereas during increase or decrease of the pressure at the beginning and end of the operation, the testing presure increases at a rate different from the increase of the sealing pressure, so that buckling of the tested pipe may occur.

A very exact adjustment of the testing and sealing pressures is necessary because pipes are required in the trade in sizes whose diameters and wall thicknesses differ only 1 mm. from each other. If pipes according to such specifications, particularly if made of non-iron metals, such as copper or brass, and having a very small wall thickness, are tested in testing apparatus which applies pressure to the ends of the pipe in order to seal the interior of the tested pipe, the sealing pressure must under no circumstances be higher than is required for pressing a sealing ring against the end of the tested pipe at such a force that no leakage across the sealing means is possible.

It is one object of the present invention to overcome the disadvantages of known testing apparatus for pipes, and to provide a testing apparatus in which the sealing pressure and the testing pressure are held at a predetermined ratio during increase and decrease of the testing pressure.

Another object of the present invention is to provide a testing apparatus for pipes in which the sealing pressure is maintained at such a level that buckling of the tested pipe is prevented.

Another object of the invention is to provide apparatus for maintaining the pressures of a plurality of hydraulic piston and cylinder means in a predetermined ratio.

With these objects in view, one embodiment of the invention comprises first and second pressure responsive means, such as cylinder and piston means which are connected by conduit means to a pressure producing pump; and fluid operated means responsive to pressure in said first cylinder and piston means and including a movable operating member connected with a control valve for moving the same to a closing position against the pressure of fluid flowing from the second cylinder and piston means through a valve into the control valve. Upon a pressure increase in the second cylinder and piston means, pressure fluid moves the control valve member to an open position and is discharged through an outlet of the control valve. Such movement of the control valve member is opposed by the operating member with a force depending on the pressure in the first cylinder and piston means so that the pressures in the first and second cylinder and piston means are maintained at a predetermined ratio.

In accordance with the preferred embodiment of the invention, the first cylinder and piston means controls the testing pressure of the fluid which is supplied into the interior of a tested pipe. The second cylinder and piston means presses a sealing means against the end of the tested pipe to prevent leakage of fluid out of the interior of the pipe. If the sealing pressure which acts in longitudinal direction of the pipe is too high, the pipe may buckle, and consequently a predetermined ratio between the sealing pressure and the testing pressure must be maintained.

In accordance with the present invention, the following four features are advantageously combined:
(a) The valve through which fluid flows into the second cylinder and piston means is a pressure reducing valve,
(b) Pressure fluid is supplied from the pressure reducing valve to the control valve means,
(c) A variable transmission connects the fluid operated means which are responsive to the pressure in the first cylinder and piston means with the control valve member, and
(d) The pressure producing pump is directly connected by a conduit to the first cylinder and piston means.

A plurality of cylinder and piston means controlled by the apparatus may be provided in addition to the cylinder and piston means which is directly connected with the pressure producing pump and operated by pressures which are in predetermined ratios to each other and to the pressure prevailing in the cylinder and piston means which is directly connected to the pump.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is partly a sectional view of a testing apparatus for pipes, and partly a schematic view illustrating a hydraulic circuit of a pressure control apparatus according to one embodiment of the invention;

FIG. 2 is a schematic view illustrating a modified embodiment of the invention; and FIG. 3 is a sectional view illustrated control elements of the hydraulic control system according to the invention.

Referring now to the drawings, and more particularly to FIGS. 1 and 2, the invention is applied to testing apparatus for testing pipes A double-acting main piston 2 is disposed in a main cylinder 1 and has an end face 7 forming a cylinder chamber 7a at the end of cylinder 1. An annular recess in piston 2 is bounded at one end by an annular shoulder 2b and at the other end by an annular inner flange of the cylinder so as to form an annular chamber 2a. A duct 1a connects cylinder chamber 7a with a conduit 16a, and another duct 1b connects the annular chamber 2a with a conduit 14b. The centrally located inner flange of cylinder 1, and another inner flange at the left end of the cylinder, form an annular chamber surrounding piston 2 and connected by a duct 11 with a conduit 10 having a valve 10a through which water is supplied into the main cylinder 1 to flow through another duct 12 into a passage 13 in the piston. A head portion 3 of the piston has a recess in which a sealing ring 4 is secured by a threaded sleeve. A pipe 5 to be tested abuts at one end against sealing ring 4, while its other end, not shown, is supported and sealed on a fixed abutment, or is received in a corresponding recess of another clyinder and piston means corresponding to cylinder 1 and piston 2.

During a testing operation, a fluid, such as oil or water, is pressed through duct 12 and passage 13 into the inerior of pipe 5 to test the resistance of the same against inner pressure. Pressure fluid will tend to flow between the annular edge at the end of the pipe and sealing ring 4, unless the sealing ring is pressed against the pipe at a pressure sufficiently high to prevent such leakage. This sealing pressure is produced by a piston 2 urged by the pressure of fluid supplied into cylinder chamber 7a and acting on end face 7. Fluid supplied through conduit 14b and duct 1b into annular chamber 2a will oppose such movement by acting on shoulder 2b, but since end face 7 has a greater area than shoulder 2b, the resultant pressure will press sealing ring 4 against the pipe, and the pressure in the annular chamber 2a will merely maintain the piston in a straight and balanced position. However, a valve, not shown, is provided in a discharge outlet of conduit 14b, permitting a discharge of the fluid from chamber 2a.

If the pressure exerted by main piston 2 on the end of the pipe is too high, the pipe would buckle. If the pressure is too low, fluid would leak across sealing ring 4. The hydraulic pressure control apparatus of the present invention maintains the sealing pressure produced by fluid in cylinder chamber 7a and the testing pressure prevailing in passage 13 and in the interior of the pipe, at such levels that no leakage takes place while no unduly high buckling forces are exerted on pipe 5 during the testing operation, and during the increase of the fluid pressure in the pipe to the predetermined testing pressure, and during the reduction of the pressure in the pipe after completion of the test If during the gradual increase and reduction of the pressure in pipe 5, the pressure exerted by piston 2 on the end of the pipe would be unduly high, buckling may take place.

An electric motor drives a pump 14 which pumps the fluid through a reduction valve into a conduit 14a which is connected to a pressure controlling cylinder and piston means including a stepped cylinder 6c and a stepped piston 6b having a large end face forming a chamber 6a in cylinder 6c communicating with conduit 14a The smaller chamber 6d communicates with conduit 10 so that the pressure is conduit 10 is in a predetermined fixed ratio to the pressure produced by pump 14 and reduction valve 15 in conduit 14a after valve 10a has been closed.

During a testing operation, the interior of pipe 5, passage 13, ducts 11 and 12, the cylinder chamber between the same, and duct 10 are filled with the testing fluid, such as water, whereupon valve 10a is closed so that the testing pressure acting in pipe 5 is determined by the pressure controlling cylinder and piston means, and can be made greater than the pressure of pump 14.

Conduit 14a is connected to conduit 14b, and to a conduit 16, 16a in which a pressure reducing valve 17 is provided. Valve 17 is best seen in the lower portion of FIG. 3, and includes a cylinder member with a valve chamber receiving a movable valve piston 17a which has a position closing conduit portion 16a, an open position, and an intermediate position throttling the flow of fluid between conduit portions 16 and 16a. A duct 17c extends longitudinally through valve piston 17a and communicates with a duct 17b connecting the valve chamber with conduit portion 16a. The duct opens at the other end of the piston in the end of the valve chamber and communicates with a conduit 17d opening into a conduit 29, which is shown in FIG. 1 in broken lines. A spring 17e acts on valve piston 17a to move the same to the open position, while the pressure in conduit portion 16a tends to urge piston 17a to a valve closing position since duct 17c is narrow. Due to the provision of pressure reducing valve 17, the pressure in conduit 16a, and in chamber 7a is lower than the pressure in conduits 14a and 16 if the valve piston 17a throttles the flow through conduit 16a.

Control valve 26 has a plug 25 provided with a narrow duct leading into a valve chamber. A movable control valve member 24 is urged by a spring 23 against a conical valve seat on plug 25. When the pressure in conduit 29 is sufficiently high, control valve member 24 will be raised from the valve seat, and fluid will flow into the valve chamber and out of the discharge conduit 26a.

Fluid operated means are provided for balancing the fluid pressure exerted on control valve member 24 by fluid flowing through conduit 29. A piston 18 is located in the cylinder 18a to which fluid is supplied through a conduit 14c from conduit 14a. The end of piston 18 carries a roller 19 cooperating with the arm 20a of a lever 20 whose other arm 20b cooperates with a roller mounted on an operating member 22 which acts through a disc 22a on the upper end of spring 23.

A fulcrum member 27 supports lever 20 for angular movement and is mounted on a guide rod 27a for movement along the same so that the fulcrum of lever 20 is displaced when a pinion 28a meshing with a rack bar portion 28 on member 27 is manually turned. Since the displacement of the fulcrum causes a variation of the effective length of the lever arms of rollers 19 and 21, the transmission ratio of the transmission 19, 20, 21, 27 is varied so that the pressure acting on control valve member 24 is in a desired ratio to the fluid pressure acting on piston 18 in conduit 14c. The construction is best seen in FIG. 3, and only schematically indicated in FIG. 1.

The apparatus is operated as follows: Water or another testing fluid is filled through conduit 10 into the interior of pipe 5, passage 13, and conduit 10, whereupon valve 10a is closed. The pump is started, and the pressure produced by the pump is adjusted by regulation of pressure reducing valve 15 so that a certain pressure prevails in conduit 14a and in chamber 6a causing piston 6b to displace fluid out of chamber 6d at a higher pressure so that a corresponding testing pressure is gradually produced in pipe 5. A check valve 30 is connected in parallel to the adjustable valve 15, but permits flow of fluid only toward pump 14.

During the filling of the pipe 5, fluid flows through conduit 16, valve 17, conduit portion 16a and duct 1a into cylinder chamber 7a and urges piston 2 to the left as viewed in FIG. 1 so that sealing ring 4 is pressed against the annular end of pipe 5, sealing the interior of pipe 5 and passage 13. The pressure exerted by piston 2 prevents movement of piston 2 away from the pipe which may be caused by pressure fluid leaking across the annular edge of the pipe and sealing ring 4 if the sealing pressure exerted by piston 2 would be insufficient. On the other hand, an unduly high sealing pressure exerted by piston 2 would be insufficiently balanced by the counteracting pressure in passage 13, and would cause buckling of the pipe.

The pressure developing in conduit 14c is proportionate to the testing pressure in pipe 5, and acts on piston 18 so that control member 22 is actuated through lever 20 to press spring 23 against control valve member 24 so that the same is urged against the valve seat of member 25 and tends to close the valve and to prevent flow of fluid from conduit 29 into the discharge conduit 26a. The force acting on valve member 24 can be adjusted by shifting fulcrum member 27 so that the ratio of the lever arms of lever 20 is varied.

As the pressure in conduit 14c increases, the pressure in conduit 16 and 16a also increases, and pressure fluid flows from conduit portion 16a through ducts 17b, 17c and 17d into conduit 29 and into the duct of valve plug 25 to urge control valve member 24 away from the valve seat and to an open position permitting flow of fluid from conduit protion 16a and cylinder chamber 7a out of discharge conduit 26a which causes a reduction of the pressure in valve chamber 17a, and of the sealing pressure exerted by main piston 2.

Since throttling duct 17c permits passage of a limited amount of fluid only, a greater increase of the pressure in chamber 7a and conduit portion 16a will cause valve piston 17a to move upward as viewed in FIG. 3 and to gradually close the connection between conduit portions 16 and 16a so that further increase of the pressure in cylinder chamber 7a is prevented when the pressure set by valve 15 is reached.

Due to the opposite effect of the pressure in conduit 14c and in conduit 16a on control valve member 24, the pressures in these conduits are maintained in a predetermined ratio selected by adjustment of the transmission 19, 20, 21, 27, and a corresponding ratio between the testing pressure in pipe 5 and the sealing pressure exerted by piston 2 is maintained during the building up of the pressures, and during the actual testing operation. The ratio is not varied during the increase of the pressure, since a pressure increase in conduit 14a, 14c causes movement of valve control member 24 toward valve seat 25 so that the discharge of fluid through discharge pipe 26a is reduced. This permits a pressure increase in conduits 16a and 14a and in the cylinder chambers connected with the same. The effective surfaces of main piston 2 and of pressure controlling piston 6b, and the pressure acting on the same are selected in such a manner that only so much sealing pressure is exerted by piston 2 as is necessary to obtain sealing of the interior of pipe 5 against leakage at the pressure prevailing in the interior of the same.

A proportionate pressure reduction after testing operation is also assured by the hydraulic pressure control apparatus of the invention. When pump 14 is stopped, the pressure in conduit 14a, and in the cylinder chambers connected thereto is relieved by flow through check valve 30. When the pressure in chamber 6a of pressure controlling cylinder 6c is reduced, piston 6b can move to the right as viewed in FIG. 1, and the pressure in conduit 10, passage 13 and pipe 5 is gradually reduced. It is necessary that the pressure in cylinder chamber 7a of cylinder 1 is reduced at the same time, and in proportion to the pressure reduction in conduit 14a and the chambers connected to the same. This is accomplished, since pressure fluid flows from conduit 16a, through ducts 17b, 17c and 17d, and conduit 29 into control valve 26 and out of the outlet of the same into discharge pipe 26a. The simultaneous reduction of the pressure in conduit 14c causes a corresponding gradual reduction of the pressure exerted by operating member 22 on control valve member 24. The pressure of the fluid in conduit 29 is sufficient to raise control valve member 24 against the action of spring 23. As a result, the testing pressure in pipe 5 and the sealing pressure in chamber 7a are simultaneously reduced at the same rate so that at no time the sealing pressure is unduly high in relation to the pressure in pipe 5, and buckling of pipe 5 is prevented.

In the embodiment of FIG. 1, the pressure controlling cylinder and piston means 6c, 6d constitutes a first hydraulic pressure responsive means, and main cylinder 1 with main piston 2 constitutes a second hydraulic pressure responsive means. In the modified embodiment of FIG. 2, three pressure responsive means, shown to be cylinder and piston means 31, 32, 33 are provided.

The embodiment of FIG. 2 illustrates the application of the hydraulic pressure control apparatus of the invention when several pressure responsive devices are to be operated at pressures and with forces which are in certain predetermined ratio to each other. Evidently, such an apparatus can be used for purposes different than the testing of pipes.

A pump 34 is driven by a motor and supplies pressure fluid directly to the chamber of a cylinder and piston means 33. A regulating valve 35 is provided in a discharge conduit to regulate the pressure in conduit means 41. Conduits 42 and 43, corresponding to conduits 16 of FIG. 1 are connected with the cylinder and piston means 31 and 32. Conduits 44 and 45 respectively corresponding to conduits 29 of the embodiment of FIG. 1, connect pressure reducing valves 17 in conduits 42 and 43 with control valve means 26 which have discharge conduits 26a, and are controlled by variable transmissions including adjustable levers 20. One end of each lever 20 acts on the movable valve member of control valve 26, and the other end of the respective lever 20 is connected to a piston 18 provided in a cylinder communicating with conduit 41. It will be understood that each pressure responsive cylinder and piston means 31 and 32 is provided with the control apparatus shown in FIG. 3, and only schematically illustrated in FIG. 2.

During operation of pump 34, the piston of pressure responsive means 33 will be operated at a certain pressure. The pistons of the fluid operated means 31 and 32 are operated at different pressures which depend on the adjustment of the transmission ratio by shifting fulcrum member 27 as described with reference to FIG. 3. Consequently, each piston will operate at a different pressure, and will exert a different force, but the pressures and forces will be interrelated to each other at predetermined ratios which can be determined by the operator. These ratios will be maintained even if the pressure of the entire system is increased by adjusting the regulating valve 35 of pump 34, and when the force exerted by the piston of the pressure responsive means 33 is increased, the forces exerted by the other two pistons will be increased in the predetermined ratio. Of course, this ratio may be changed by varying the transmission ratios of the two levers 20 respectively associated with the cylinder and piston means 31 and 32.

It will be understood that each of the elements described above, or two or more together, may also find a useful application in other types of hydraulic pressure control apparatus differing from the types described above.

While the invention has been illustrated and described as embodied in a testing apparatus for pipes in which the testing pressure and the sealing pressure are maintained at a predetermined ratio, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Hydraulic pressure control apparatus, comprising, in combination, first hydraulic pressure responsive means; second hydraulic pressure responsive means; pressure producing means; conduit means connecting said pressure producing means with said first and second pressure responsive means and including a first conduit connected with said first pressure responsive means and a second conduit connected with said second pressure responsive means; a control valve means having an outlet and including a control valve member movable between a position closing said outlet and an open position, and being operable by fluid to move to said open position; fluid operated means connected with said first conduit responsive to pressure in said first pressure responsive means and including movable operating means operatively connected with said control valve member for urging the same to said closing position with a force depending on the pressure in said first pressure responsive means; and a valve in said second conduit communicating with said control valve means so that upon a pressure increase in said second pressure responsive means, pressure fluid from said second conduit moves said control valve member to said open position and is discharged through said outlet whereby the pressures in said first and second pressure responsive means are maintained at a predetermined ratio.

2. Hydraulic pressure control apparatus, comprising, in combination, first hydraulic pressure responsive means; second hydraulic pressure responsive means; pressure producing means; conduit means connecting said pressure producing means with said first and second pressure responsive means and including a first conduit connected with said first pressure responsive means and a second conduit connected with said second pressure responsive means; a control valve means having an outlet and including a control valve member movable between a position closing said outlet and an open position, and being operable by fluid to move to said open position; fluid operated means connected with said first conduit responsive to pressure in said first pressure responsive means and including movable operating means operatively connected with said control valve member for urging the same to said closing position with a force depending on the pressure in said first pressure responsive means; and a pressure reducing valve in said second conduit communicating with said control valve means so that upon a pressure increase in said second pressure responsive means, pressure fluid from said second conduit moves said control valve member to said open position and is discharged through said outlet whereby the pressures in said first and second pressure responsive means are maintained at a predetermined ratio.

3. Hydraulic pressure control apparatus, comprising, in combination, first hydraulic pressure responsive means; second hydraulic pressure responsive means; pressure producing means; conduit means connecting said pressure producing means with said first and second pressure responsive means and including a first conduit connected with said first pressure responsive means and a second conduit connected with said second pressure responsive means; a control valve means having an outlet and including a control valve member movable between a position closing said outlet and an open position, and being operable by fluid to move to said open position; fluid operated means connected with said first conduit responsive to pressure in said first pressure responsive means and including movable operating means operatively connected with said control valve member for urging the same to said closing position with a force depending on the pressure in said first pressure responsive means; and a pressure reducing valve in said second conduit controlling the flow to said second pressure responsive means and having a duct for connecting said second pressure responsive means with said control valve means so that upon a pressure increase in said second pressure responsive means, pressure fluid from said second conduit moves said control valve member to said open position and is discharged through said outlet whereby the pressures in said first and second pressure responsive means are maintained at a predetermined ratio.

4. Hydraulic pressure control apparatus, comprising, in combination, first hydraulic pressure responsive means; second hydraulic pressure responsive means; pressure producing means; conduit means connecting said pressure producing means with said first and second pressure responsive means and including a first conduit connected with said first pressure responsive means and a second conduit connected with said second pressure responsive means; a control valve means having an outlet and including a control valve member movable between a position closing said outlet and an open position, and being operable by fluid to move to said open position; fluid operated means connected with said first conduit responsive to pressure in said first pressure responsive means and including movable operating means operatively connected with said control valve member for urging the same to said closing position with a force depending on the pressure in said first pressure responsive means; and a pressure reducing valve in said second conduit and including a piston responsive to pressure to reduce the cross section and to close said second conduit, and a spring opposing the closing movement of said piston, said piston controlling the flow to said second pressure responsive means and having a duct for connecting said second pressure responsive means with said control valve means so that upon a pressure increase in said second pressure responsive means, pressure fluid from said second conduit moves said control valve member to said open position and is discharged through said outlet whereby the pressures in said first and second pressure responsive means are maintained at a predetermined ratio.

5. Hydraulic pressure control apparatus, comprising, in combination, first hydraulic pressure responsive means; second hydraulic pressure responsive means; pressure producing means; conduit means connecting said pressure producing means with said first and second pressure responsive means and including a first conduit connected with said first pressure responsive means and a second conduit connected with said second pressure responsive means; a control valve means having an outlet and including a control valve member movable between a piston closing said outlet and an open position, and being operable by fluid to move to said open position; fluid operated means including a piston and a cylinder connected with said first conduit and responsive to pressure in said first pressure responsive means, a movable operating member operatively connected with said control valve member, and variable transmission means connecting said piston with said movable operating member so that said control valve member is urged to said closing position with a force proportional to the pressure in said first conduit acting on said piston; and a valve in said second conduit communicating with said control valve means so that upon a pressure increase in said second pressure responsive means, pressure fluid from said second conduit moves said control valve member to said open position and is discharged through said outlet whereby the pressures in said first and second pressure responsive means are maintained at a predetermined ratio.

6. Hydraulic pressure control apparatus, comprising, in combination, first hydraulic pressure responsive means; second hydraulic pressure responsive means; pressure producing means; conduit means connecting said pressure producing means with said first and second pressure responsive means and including a first conduit connected with said first pressure responsive means and a second conduit connected with said second pressure responsive means; a control valve means having an outlet and including a control valve member movable between a position closing said outlet and an open position, and being operable by fluid to move to said open position; fluid operated means including a piston and a cylinder connected with said first conduit and responsive to pressure in said first pressure responsive means, a movable operating member operatively connected with said control valve member; lever means connecting said piston with said operating member, and means supporting said lever means for angular movement about an axis and being adjustable for varying the position of the fulcrum of said lever means and thereby the ratio of transmission between said piston and said operating member so that upon displacement of said piston, said control valve member is urged by said operating member to said closing position with a force proportionate to the pressure in said first conduit; and a valve in said second conduit communicating with said control valve means so that upon a pressure increase in said second pressure responsive means, pressure fluid from said second conduit moves said control valve member to said open position and is discharged through said outlet whereby the pressures in said first and second pressure responsive means are maintained at a predetermined ratio.

7. A hydraulic pressure control apparatus as set forth in claim 6 wherein said control valve means includes a spring connecting said operating member with said movable valve member and urging said valve member to said closing position.

8. Hydraulic pressure control apparatus, comprising, in combination, first hydraulic pressure responsive means; second hydraulic pressure responsive means; pressure producing means; conduit means connecting said pressure producing means with said first and second pressure responsive means and including a first conduit connected with said first pressure responsive means and a second conduit connected with said second pressure responsive means; a control valve means having an outlet and including a control valve member movable between a position closing said outlet and an open position, and being operable by fluid to move to said open position; fluid operated means including a piston and a cylinder connected with said first conduit and responsive to pressure in said first pressure responsive means, a movable operating member operatively connected with said control valve member, and variable transmission means connecting said piston with said movable operating member so that said control valve member is urged to said closing position with a force proportional to the pressure in said first conduit acting on said piston; and a pressure reducing valve in said second conduit controlling the flow to said second pressure responsive means and having a duct for connecting said second pressure responsive means with said control valve means so that upon a pressure increase in said second pressure responsive means, pressure fluid from said second conduit moves said control valve member to said open position and is discharged through said outlet whereby the pressures in said first and second pressure responsive means are maintained at a predetermined ratio.

9. A hydraulic pressure control apparatus as set forth in claim 8 wherein said variable transmission means includes a double armed lever, a fulcrum member supporting said lever for angular movement; and means for moving said fulcrum member; and including roller means on said operating member and piston in rolling engagement with the arms of said double-armed lever whereby by displacement of said fulcrum member, the transmission ratio of said lever is varied.

10. A testing apparatus for pipes including a pressure controlling piston and cylinder; a main cylinder, and a main piston in said main cylinder forming a cylinder chamber therein, said main piston having a passage therein communicating with said pressure controlling cylinder and adapted to be connected to the interior of a pipe which is in sealing contact with said main piston; a pump; conduit means connecting said pump with said main cylinder and with said pressure controlling cylinder, and including a first conduit connected with a first chamber formed by said pressure controlling piston in said pressure controlling cylinder, and a second conduit connected with said cylinder chamber of said main cylinder; a control valve means having an outlet and including a control valve member movable between a position closing said outlet and an open position, and being operable by fluid to move to said open position; fluid operated means in said first conduit responsive to pressure in said first chamber of said pressure controlling cylinder and including movable operating means operatively connected with said control valve member for urging the same to said closing position with a force depending on the pressure in said pressure controlling cylinder and in said pipe; a pressure reducing valve in said second conduit communicating with said control valve means so that upon a pressure increase in said chamber of said main cylinder, pressure fluid from said second conduit moves said control valve member to said open position and is discharged through said outlet whereby the pressures in said pipe and the sealing pressure exerted by said main piston on said pipe are maintained at a predetermined ratio.

11. A testing apparatus for pipes comprising a pressure controlling piston and cylinder; a main cylinder, and a main piston in said main cylinder forming a cylinder chamber therein, said main piston having a passage therein communicating with said pressure controlling cylinder and adapted to be connected to the interior of a pipe which is in sealing contact with said main piston; a pump; conduit means connecting said pump with said main cylinder and with said pressure controlling cylinder, and including a first conduit connected with a first chamber formed by said pressure controlling piston in said pressure controlling cylinder, and a second conduit connected with said cylinder chamber of said main cylinder; a control valve means having an outlet and including a control valve member movable between a position closing said outlet and an open position, and being operable by fluid to move to said open position; fluid operated means in said first conduit responsive to pressure in said first chamber of said pressure controlling cylinder and including movable operating means operatively connected with said control valve member for urging the same to said closing position with a force depending on the pressure in said pressure controlling cylinder and in said pipe; a pressure reducing valve in said second conduit controlling the flow to said chamber of said main cylinder and having a duct for connecting said main cylinder with said control valve means so that upon a pressure increase in said chamber of said main cylinder, pressure fluid from said second conduit moves said control valve member to said open position and is discharged through said outlet whereby the pressures in said pipe and the sealing pressure exerted by said main piston on said pipe are maintained at a predetermined ratio.

12. A testing apparatus for pipes comprising a pressure controlling piston and cylinder; a main cylinder, and a main piston in said main cylinder forming a cylinder chamber therein, said main piston having a passage therein communicating with said pressure controlling cylinder and adapted to be connected to the interior of a pipe which is in sealing contact with said main piston; a pump; conduit means connecting said pump with said main cylinder and with said pressure controlling cylinder, and including a first conduit connected with a first chamber formed by said pressure controlling piston in said pressure controlling cylinder, and a second conduit connected with said cylinder chamber of said main cylinder; a control valve means having an outlet and including a control valve member movable between a position closing said outlet and an open position, and being operable by fluid to move to said open position; fluid operated means including a piston in said first conduit responsive to pressure in said pressure controlling cylinder and in said pipe, a movable operating member operatively connected with said control valve member, and variable transmission means connecting said piston with said operating member so that the same is urged to said closing position with an adjustable force proportionate to the pressure in said pipe; a pressure reducing valve in said second conduit controlling the flow to said chamber of said main cylinder and having a duct for connecting said main cylinder with said control valve means so that upon a pressure increase in said chamber of said main cylinder, pressure fluid from said second conduit moves said control valve member to said open position and is discharged through said outlet whereby the pressures in said pipe and the sealing pressure exerted by said main piston on said pipe are maintained at a predetermined ratio.

13. A testing apparatus as set forth in claim 12 wherein said main piston has an end face forming said cylinder chamber in said main cylinder, and has a peripheral recessed portion forming an annular chamber in said main cylinder bounded by an annular shoulder of said main piston, and a conduit connecting said second conduit with said annular chamber so that pressure acting on said annular shoulder opposes the pressure exerted in said cylinder chamber on said end face of said main piston.

14. A testing apparatus as set forth in claim 12 wherein said main piston has a head portion projecting from said main cylinder and having a recess, and a sealing ring in said recess adapted to be pressed by said main piston against the end of the pipe to be tested so that fluid in said pipe is prevented from flowing out across said sealing ring by the pressure exerted by said main piston on said sealing ring and pipe.

15. A testing apparatus as set forth in claim 12 and including another pressure reducing valve in said conduit means between said first and second conduit means and said pump; and a check valve connected in parallel to said last mentioned pressure reducing valve and permitting flow from said first and second conduits into said pump.

16. A hydraulic pressure control apparatus comprising, in combination, first, second, and third cylinder and piston means; a pump; conduit means connecting said pump with said first, second and third cylinder and piston means and including a first conduit connected with said first piston and cylinder means and second and third conduits connected with said second and third cylinder and piston means, respectively; two control valve means respectively associated with said second and third cylinder and piston means, each control valve means having an inlet and an outlet and including a control valve member movable between a position closing said outlet and an open position, and being operable by fluid entering said inlet to move to said open position; two fluid operated means respectively associated with said second and third cylinder and piston means, said fluid operating means communicating, respectively with said second and third conduits and being responsive to pressure in the same, each fluid operated means including a movable operating member, and variable transmission means for connecting said operating members, respectively, with said control valve members for urging the same, respectively to said closing positions with a force depending on the pressures in said second and third conduits, respectively; and a valve in each of said second and third conduits having an outlet communicating with said control valve means, respectively so that upon a pressure increase in one of said hydraulic piston and cylinder means, pressure fluid moves said control valve members, respectively, to said open position and is discharged whereby the pressures in said first, second and third piston and cylinder means are maintained at a predetermined ratio.

17. An apparatus as set forth in claim 16 wherein said valves in said second and third conduits are pressure reducing valves including a piston movable to and from a position closing the respective conduit, a spring urging said last mentioned piston to a position opening the respective conduit, said piston having a duct for connecting the portion of the respective second or third conduit communicating with said second and third cylinder and piston means with said control valve means.

18. An apparatus as set forth in claim 16 and including a discharge conduit connected with said first conduit, and a pressure regulating valve in said discharge conduit and being adjustable for setting the pressure in said first cylinder and piston means so that by adjustment of said variable transmissions, the pressures in said second and third cylinder and piston means are in a predetermined ratio to the pressure in said first cylinder and piston means.

19. An apparatus as set forth in claim 18 wherein said variable transmission means include a lever; and a manually movable member supporting said lever means for angular movement about a fulcrum whereby the transmission ratio of said lever can be adjusted.

20. An apparatus as set forth in claim 16 wherein said control valve means includes a spring connecting said control valve member with said operating member.

References Cited by the Examiner
UNITED STATES PATENTS

| | | | |
|---|---|---|---|
| 2,705,888 | 4/1955 | Sedwick | 73—49.6 |
| 2,883,859 | 4/1959 | Nerrill | 73—49.6 |

LOUIS R. PRINCE, *Primary Examiner.*

J. NOLTON, *Assistant Examiner.*